INVENTOR.
Rudolph A. Ferrara
BY
Robert L. Spencer
ATTORNEY

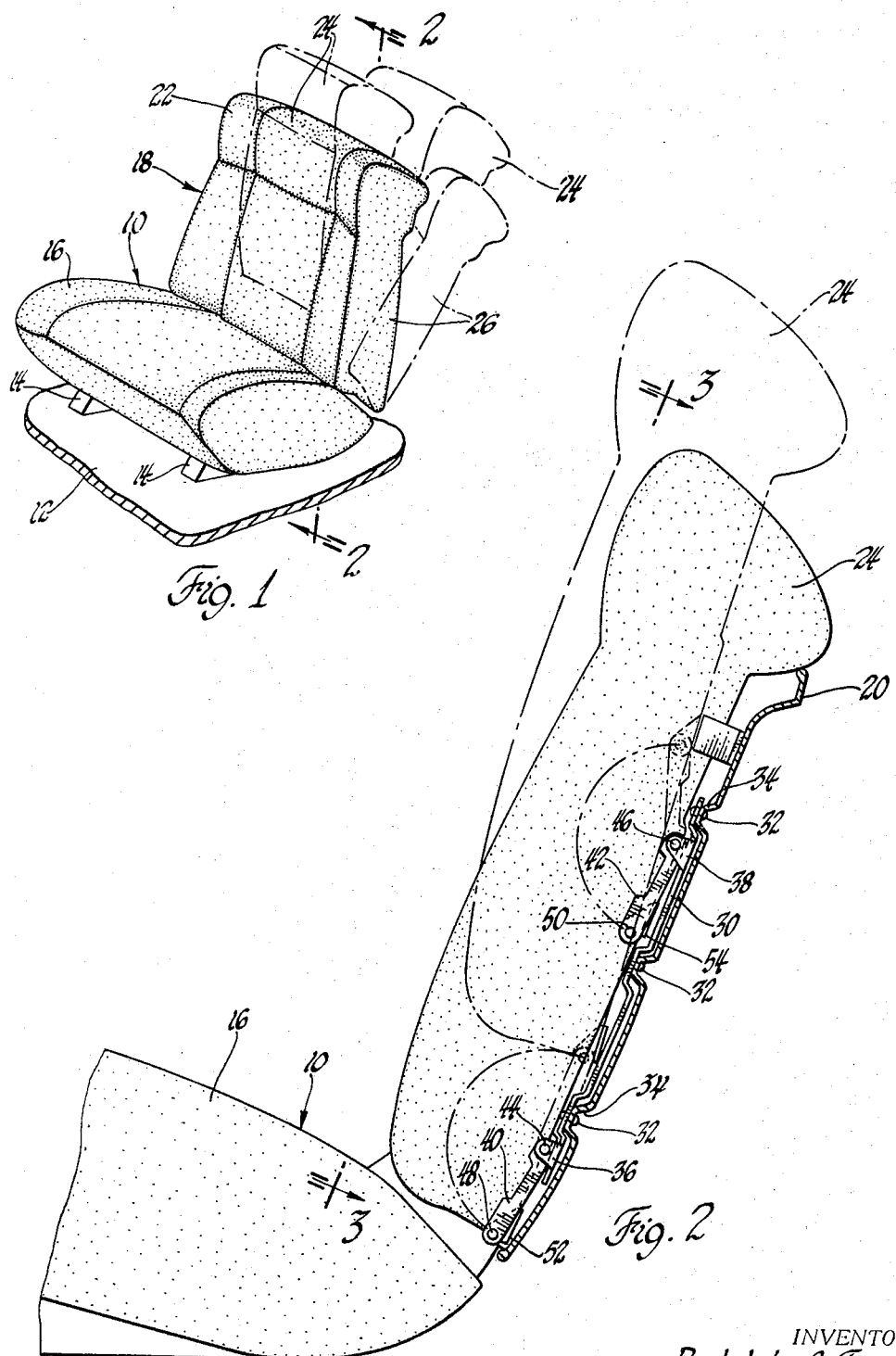

United States Patent Office 3,343,875
Patented Sept. 26, 1967

3,343,875
ADJUSTABLE SEAT BACK HEADREST
Rudolph A. Ferrara, Warren, Mich., assignor to General Motors Corporation, Detroit, Mich., a corporation of Delaware
Filed Oct. 6, 1965, Ser. No. 493,443
4 Claims. (Cl. 297—410)

ABSTRACT OF THE DISCLOSURE

A seating assembly for a vehicle that includes a seat back unit having a frame which supports a plurality of cushion segments extending from the top to the bottom of the seat back. One cushion segment is movable in a vertical direction between a seat back forming position and an extended headrest forming position.

---

This invention relates to a vehicle seating arrangement and more particularly to an adjustable seat back having a portion thereof movable from the seat forming position to a headrest forming position.

The present trend in automotive vehicles is for increased usage of the individual or bucket seat construction for the driver and front seat passenger. A further modification of the conventional bucket seating arrangements is to have the seat back reclineable to various positions of adjustment and to provide a headrest for supporting the occupant's head in the various positions of adjustment. A barber chair type headrest which has the vertically adjustable headrest as a projection above the seat back of ordinary height is considered to be undesirable from an appearance standpoint. Another objection to this type of headrest is that the headrest is too firm for an occupant's comfort due to a relatively small frame.

To eliminate the present objections, headrests which form the top bolster for a seat back of ordinary height, and are vertically adjustable to a headrest position have been provided but are still objectionable due to the small frame around the headrest that does not permit acceptable yieldability and often has objectionable hard portions at the bottom due to the relatively small vertical dimension.

Removable headrests that may be attached to the seat back are inconvenient to use and present a storage problem when not in use.

It is an object of this invention to provide a reclineable seat back having a vertical portion thereof adjustable between a seat forming position and a headrest forming position.

Another object of this invention is to provide a seat back that is divided into three sections wherein each section extends from the seat cushion to the top of the seat back and each section has the same construction as an ordinary seat back with the center section being vertically adjustable between the seat forming position and a headrest forming position.

A further object of this invention is to provide a three section seat back in which the central section is secured to the seat back frame by linkage means which permit vertical adjustment of the central section between a seat forming position and a headrest position.

Another object of this invention is to provide an adjustable seat back portion connected to the seat frame by a linkage means that can be moved between a seat back forming position and a headrest forming position and locked in the headrest forming position by the over-center movement of the linkage means.

These and other objects of this invention will become more apparent as reference is had to the specification and drawings wherein:

FIGURE 1 is a perspective view of a vehicle seating unit utilizing the present invention and showing the central section of the seat back in solid lines in the seat forming position and in phantom lines in headrest forming positions and also showing in phantom lines the seat back in a reclining position.

FIGURE 2 is a view substantially along the line 2—2 of FIGURE 1, in the direction of the arrows, with sections cut away, showing the linkage means connecting the adjustable central portion of the seat back to the seat back frame and illustrating the adjustable seat back portion in solid lines in the seat back forming position and in phantom lines in the headrest forming position.

Figure 3:
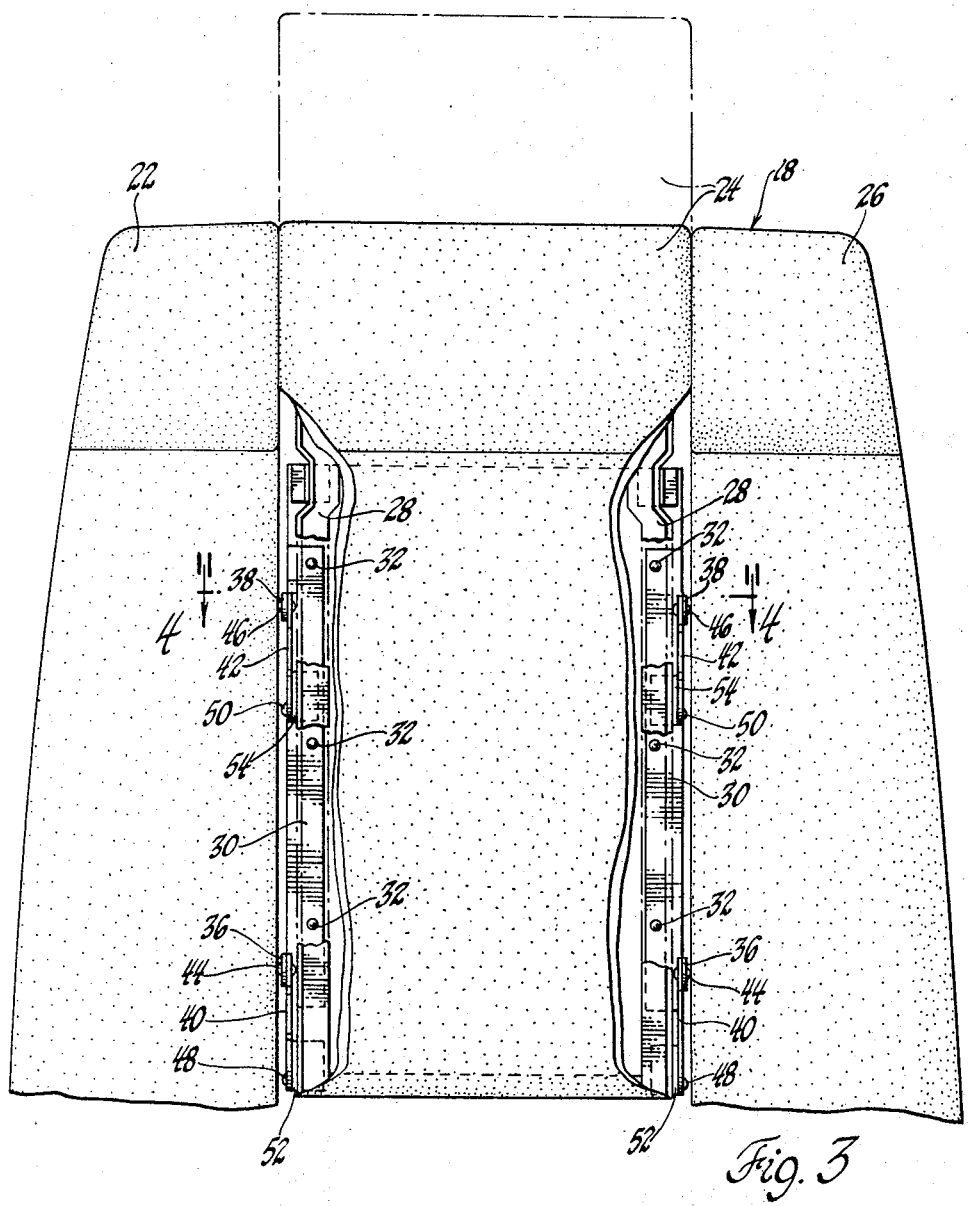
FIGURE 3 is a view along the line 3—3 of FIGURE 2 in the direction of the arrows, with sections broken away to illustrate the linkage means connecting the adjustable central portion of the seat back to the seat back frame or pan and shows the headrest position of the central portion in phantom lines.

Referring now to the drawings and particularly FIGURE 1, a vehicle "bucket" seating assembly, indicated generally by the numeral 10, is supported on a vehicle floor 12 by conventional support brackets 14. Such seating assemblies are generally intended for use as front seats in two door vehicles.

The seating assembly 10 includes a conventional seat unit 16 secured to and supported on the support brackets 14 and a novel seat back unit 18 pivotally secured to the seat unit 16 for forward folding over the seat unit for easy entrance to the rear seats of the vehicle. The seat back unit may also be pivoted to the rear by conventional reclining mechanism for various positions of reclining adjustment, as desired. One of the reclining positions is shown in phantom lines in FIGURE 1.

Figure 4:
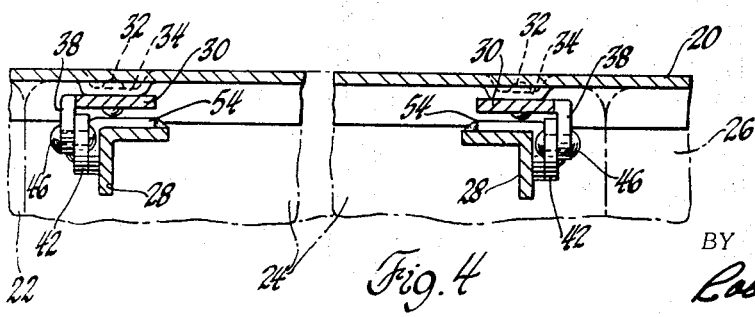
FIGURE 4 is a view along the line 4—4 of FIGURE 3 in the direction of the arrows giving a vertical view of the arrangement of the linkage means connecting the adjustable central headrest portion with the seat back frame.

As best seen in FIGURES 2 through 4, seat back unit 18 includes a supporting pan or frame 20 which supports three vertical cushion segments 22, 24, 26, respectively. Each cushion segment is constructed of conventional springs, padding and cover. The outside segments 22, 26 are mounted on the seat back frame 20, in a conventional manner, while the center segment 24 is mounted on a sub-frame 28 which is connected to the seat back by a linkage means for movement relative to the seat back frame and adjoining seat back cushion segments.

The sub-frame 28 of the cushion segment 24 is secured to the seat back frame 20 by a plurality of links. In the embodiment illustrated, identical linkages are used on each side of the cushion segment 24 for moving between the seat back forming position, shown in solid lines, and the headrest forming position, shown in phantom lines, of FIGURES 2 and 3. For ease of explanation, the linkage and operation thereof for the right hand side of the seat back cushion segment 24, as viewed in FIGURE 3, will be described, and identical numerals will be used for corresponding structure on the left hand side.

A mounting bracket 30 is secured to the seat back pan 20 by a plurality of rivets 32 or other suitable means. If a smooth surface is desired for the seat back frame or pan 20, the seat back pan may be embossed as at 34 to provide mounting pads for the mounting bracket 30. Adjacent each end of the mounting bracket 30 pivot tabs 36, 38, respectively, are secured to the mounting bracket for pivotally supporting one end of the respective connecting links 40, 42 to the mounting bracket 30 by means of the pivot rivets 44, 46, respectively. The respective pivot rivets 48, 50 pivotally secure the other end of links 40, and 42 to the support tabs 52, 54, respectively, which are secured to the cushion segment sub-frame 28. The connecting links 40, 42 are substantially of the same length and substantially parallel.

A stop 56 is secured to the seat back pan 20 by welding or other suitable means and is positioned to contact the sub-frame 28 at the point adjacent tab 54 for limiting pivotal movement of the seat back segment 24 about pivot rivet 46 at the headrest position of the cushion segment.

In operation, to move the center cushion segment 24 from its seat forming position, shown in solid lines in FIGURES 2 and 3, to the headrest forming position, shown in phantom lines in FIGURES 2 and 3, force may be applied to the bottom of cushion segment 24 adjacent the seat 16 in a forward and upward direction for causing the cushion segment to be pivoted on links 40, 42 about the pivot rivets 44, 46, in a clockwise direction, as viewed in FIGURE 2, until the sub-frame 28 contacts the stop 56. The stop 56 prevents further clockwise rotation of link 42, but link 40 continues to travel clockwise about pivot rivet 44 to an overcenter position in contact with the mounting bracket 30. During the clockwise overcenter travel of link 40, the cushion segment pivots counterclockwise about pivot rivet 50 to its headrest forming position. The overcenter movement of link 40 locks the adjustable segment 24 in the headrest position and the normal weight applied by the seat occupant's back during use of the headrest together with the overcenter position of link 40 will maintain the segment in headrest position during use. If desired, a conventional locking mechanism could be mounted on the seat back for positive locking of the segment in the desired positions.

To return the adjustable segment from headrest forming position to the seat forming position, forward pressure is applied to the bottom of the segment and/or rearward pressure is applied to the top of the segment to move link 40 from its overcenter position in contact with the mounting bracket. When the link 40 returns to parallel alignment with link 42, the links 40, 42 then pivot counterclockwise about pivot rivets 44, 46 for returning the adjustable segment to its seat forming position. When the seat pan contacts the sub-frame of the cushion assembly the sub-frame acts as a stop for positioning said cushion assembly in seat back forming position.

Thus, it can be seen that a seat back headrest is provided that does not present a storage problem when not in use and also provides a headrest as resilient and comfortable as the seat back cushion.

While but one embodiment of this invention is shown and explained, it is not intended to limit this invention in anyway other than by the limits of the following claims:

I claim:
1. In combination in a vehicle body having a seating assembly mounted therein, said seating assembly having a seat unit and a seat back unit connected to said seat unit, said seat back unit including a frame, a plurality of cushion segments secured on said frame and each extending from top to bottom of said seat back, one of said cushion segments having a seat back forming position and an extended headrest forming position and being movable therebetween, linkage means pivotally connecting said movable cushion segment to said frame, locking means for securing said movable cushion segment in said headrest position and stop means for limiting movement of said movable cushion.

2. The apparatus as claimed in claim 1 wherein said linkage means includes a first link and a second link, each of said links having one end pivotally connected to said frame and the other end pivotally connected to said movable cushion segment for controlling movement of said movable cushion segment between said position, and said first link and said second link being substantially parallel in said seat back forming position of said movable cushion assembly.

3. The apparatus as claimed in claim 2 wherein said first link and said second link remain substantially parallel during pivotal movement about said one end as said movable cushion segment moves from said seat back position toward said headrest forming position and until said movable cushion segment contacts said stop means thereby limiting pivotal movement of said first link about its said one end, and said second link continuing pivotal movement about its said one end to an overcenter position for securing said movable cushion segment in said headrest forming position.

4. In combination in a vehicle body having a seating assembly mounted therein, said seating assembly having a seat unit mounted on said body, a seat back unit connected to said seat unit for forming said seating assembly, said seat back unit including a seat back frame connected to said seat unit, a seat back cushion mounted on said frame, said seat back cushion being divided into a plurality of vertically extending cushion segments, each of said cushion segments extending from top to bottom of said seat back, at least one of said cushion segments having a seat back forming position and a headrest forming position and being movable therebetween, linkage means for pivotally securing said movable segments to said seat back frame for movement between said positions, each of said movable cushion segments including a sub-frame for supporting said movable cushion segment and support tabs secured to said sub-frame for pivotally connecting said movable cushion segment to said linkage means, said linkage means including a first link and a second link substantially parallel to said first link in said seat back forming position, one end of each of said links being pivotally secured to said seat back frame, the other end of each of said links being secured to a respective support tab on said sub-frame, stop means for limiting pivotal movement of said links in said headrest position and said seat back forming positions, said second link being pivotable overcenter to a non parallel position relative to said first link for contacting said stop means in said headrest forming position for securing said movable cushion segment in said headrest forming position.

References Cited
UNITED STATES PATENTS

| | | | |
|---|---|---|---|
| 1,968,232 | 7/1934 | Thomas | 296—69 |
| 2,652,101 | 9/1953 | Samsky et al. | 297—410 |
| 2,886,097 | 5/1959 | Katz | 297—410 |
| 3,132,894 | 5/1964 | Schliephacke | 297—61 |
| 3,159,427 | 12/1964 | Lawson | 297—410 |

BENJAMIN HERSH, *Primary Examiner.*

J. H. BRANNEN, *Assistant Examiner.*